United States Patent
Hu et al.

(10) Patent No.: US 9,962,792 B2
(45) Date of Patent: May 8, 2018

(54) COMPONENT REPAIR USING CONFINED LASER DRILLING

(71) Applicant: General Electric Company, Schenectady, NY (US)

(72) Inventors: Zhaoli Hu, Greer, SC (US); Abe Denis Darling, Laurens, SC (US); Shamgar Elijah McDowell, Simpsonville, SC (US); Douglas Anthony Serieno, Simpsonville, SC (US); Jonathan Matthew Lomas, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 14/626,955

(22) Filed: Feb. 20, 2015

(65) Prior Publication Data
US 2016/0243654 A1    Aug. 25, 2016

(51) Int. Cl.
*B23K 26/00*    (2014.01)
*B21K 25/00*    (2006.01)
(Continued)

(52) U.S. Cl.
CPC .......... *B23K 26/382* (2015.10); *B23K 26/032* (2013.01); *B23K 26/042* (2015.10);
(Continued)

(58) Field of Classification Search
CPC ............ B23K 2201/001; B23K 26/032; B23K 26/042; B23K 26/0876; B23K 26/14;
(Continued)

(56) References Cited

U.S. PATENT DOCUMENTS

| 4,027,137 A | 5/1977 | Liedtke |
| 4,090,572 A * | 5/1978 | Welch ................ B23K 26/1476 |
| | | 175/16 |

(Continued)

FOREIGN PATENT DOCUMENTS

| DE | 3643284 | 12/1986 |
| EP | 0515983 | 5/1992 |

(Continued)

OTHER PUBLICATIONS

European Search Report and Opinion issued in connection with corresponding EP Application No. EP16154881.3 dated Jul. 6, 2016.

(Continued)

*Primary Examiner* — Dana Ross
*Assistant Examiner* — Ket D Dang
(74) *Attorney, Agent, or Firm* — Dority & Manning, P.A.

(57) ABSTRACT

A method for repairing one or more holes in a near wall of a component is provided. The method includes determining updated hole information, including an updated location, of a first hole in the near wall of the component. The method also includes directing a confined laser beam of the confined laser drill towards the near wall of the component at the updated location of the first hole to drill through a coating of the component extending over and/or positioned in the first hole. The method also includes sensing a characteristic of light reflected from the updated location of the first hole and determining the confined laser beam of the confined laser drill has drilled through a portion of the coating of the component extending over and/or positioned in the first hole based on the sensed characteristic of light.

8 Claims, 10 Drawing Sheets

(51) Int. Cl.
  *B23K 26/382* (2014.01)
  *B23K 26/08* (2014.01)
  *B23K 26/14* (2014.01)
  *B23K 26/40* (2014.01)
  *F01D 5/00* (2006.01)
  *B23K 26/042* (2014.01)
  *B23K 26/03* (2006.01)
  *F01D 5/14* (2006.01)
  *B23K 101/00* (2006.01)

(52) U.S. Cl.
  CPC .......... *B23K 26/0876* (2013.01); *B23K 26/14* (2013.01); *B23K 26/389* (2015.10); *B23K 26/40* (2013.01); *F01D 5/005* (2013.01); *F01D 5/147* (2013.01); *B23K 2201/001* (2013.01); *F05D 2230/13* (2013.01); *Y02T 50/673* (2013.01)

(58) Field of Classification Search
  CPC .... B23K 26/382; B23K 26/389; B23K 26/40; F01D 5/005; F01D 5/147; F05D 2230/13
  USPC ... 219/121.7, 69.15, 121.61, 121.66, 121.69, 219/121.72, 121.68, 121.83, 121.76, 219/121.71, 121.67, 121.62; 29/889.2, 29/889.7, 889.71, 889.1, 887.1, 889, 29/889.721, 889.72, 402.06, 402.04, 29/402.08, 402.18; 416/241 R, 224; 427/540, 555, 8, 142, 596
  See application file for complete search history.

(56) References Cited

U.S. PATENT DOCUMENTS

| | | | |
|---|---|---|---|
| 4,873,414 A * | 10/1989 | Ma | B23K 26/032 219/121.62 |
| 4,905,310 A | 2/1990 | Ulrich | |
| 4,931,615 A | 6/1990 | Muncy et al. | |
| 4,940,880 A | 7/1990 | Klingel et al. | |
| 4,952,771 A | 8/1990 | Wrobel | |
| 5,026,979 A | 6/1991 | Ortiz, Jr. et al. | |
| 5,045,669 A | 9/1991 | Ortiz, Jr. et al. | |
| 5,182,434 A | 1/1993 | Nakata | |
| 5,216,808 A * | 6/1993 | Martus | B23K 26/032 29/889.1 |
| 5,222,617 A | 6/1993 | Gregory et al. | |
| 5,365,033 A * | 11/1994 | Williams | B23K 26/03 219/121.71 |
| 5,367,144 A | 11/1994 | Matsumura et al. | |
| 5,374,803 A | 12/1994 | Yamada | |
| 5,773,791 A | 6/1998 | Kuykendal | |
| 5,902,499 A | 5/1999 | Richerzhagen | |
| 5,928,534 A * | 7/1999 | Flis | B23K 26/18 219/121.71 |
| 6,001,219 A | 12/1999 | Caspar | |
| 6,140,604 A | 10/2000 | Somers et al. | |
| 6,251,315 B1 * | 6/2001 | Reed | B23K 26/18 219/121.71 |
| 6,329,633 B1 * | 12/2001 | Lamm | B23K 26/18 219/121.7 |
| 6,380,512 B1 * | 4/2002 | Emer | B23K 26/04 219/121.71 |
| 6,696,666 B2 | 2/2004 | Merdan et al. | |
| 6,723,951 B1 | 4/2004 | Mcgraw | |
| 7,163,875 B2 | 1/2007 | Richerzhagen et al. | |
| 7,192,622 B2 * | 3/2007 | Fernihough | C23C 8/04 427/157 |
| 7,204,019 B2 * | 4/2007 | Ducotey, Jr. | B23H 9/10 29/402.06 |
| 7,728,258 B2 | 6/2010 | Richerzhagen et al. | |
| 8,581,141 B2 | 11/2013 | Muratsubaki et al. | |
| 8,653,409 B1 * | 2/2014 | Sodhi | B23K 26/0081 219/121.61 |
| 2003/0111447 A1 * | 6/2003 | Corkum | B23K 26/032 219/121.69 |
| 2004/0224179 A1 | 11/2004 | Sokol et al. | |
| 2006/0096964 A1 | 5/2006 | Fordahl | |
| 2007/0193990 A1 | 8/2007 | Richerzhagen et al. | |
| 2007/0278195 A1 | 12/2007 | Richerzhagen et al. | |
| 2009/0001061 A1 | 1/2009 | Beck | |
| 2009/0220349 A1 * | 9/2009 | Bolms | F01D 5/005 416/97 R |
| 2009/0314753 A1 | 12/2009 | Kosmowski | |
| 2010/0147812 A1 | 6/2010 | Beck et al. | |
| 2010/0147814 A1 | 6/2010 | Watanabe | |
| 2011/0049113 A1 | 3/2011 | Glaesemann et al. | |
| 2011/0076405 A1 | 3/2011 | Raji et al. | |
| 2011/0240615 A1 | 10/2011 | Suruceanu et al. | |
| 2012/0074105 A1 | 3/2012 | Okamoto et al. | |
| 2012/0324731 A1 * | 12/2012 | Gagnon | A61C 13/0004 29/896.1 |
| 2013/0020292 A1 | 1/2013 | Elfizy et al. | |
| 2013/0146570 A1 | 6/2013 | Forsman et al. | |
| 2013/0206739 A1 * | 8/2013 | Reed | F01D 25/12 219/121.71 |
| 2014/0075755 A1 | 3/2014 | Hu et al. | |
| 2014/0076857 A1 | 3/2014 | Hu et al. | |
| 2014/0076868 A1 | 3/2014 | Hu et al. | |
| 2014/0349029 A1 * | 11/2014 | Burd | F01D 5/005 427/540 |
| 2015/0033559 A1 * | 2/2015 | Bruck | B23K 26/0661 29/889.1 |

FOREIGN PATENT DOCUMENTS

| | | |
|---|---|---|
| EP | 0937533 | 8/1999 |
| EP | 1739410 A1 | 1/2007 |
| EP | 1941965 A1 | 7/2008 |
| EP | 1833636 | 7/2010 |
| GB | 2113592 | 8/1983 |
| JP | 63140779 A * | 6/1988 |
| WO | 95/32834 | 12/1995 |

OTHER PUBLICATIONS

U.S. Appl. No. 14/164,506, filed Sep. 14, 2012.
U.S. Appl. No. 14/164,522, filed Jan. 27, 2014.
U.S. Appl. No. 14/164,539, filed Jan. 27, 2014.
U.S. Appl. No. 14/164,506, filed Jan. 27, 2014.
Sensors-2012, ISSN 1424-8220; On Line Estimation of Laser-Drilled Hole Depth Using A Machine Vision Method, Chao-Ching Ho, et al. Published Jul. 27, 2012, pp. 10148-10162.

* cited by examiner

COMPONENT REPAIR USING CONFINED LASER DRILLING

FIELD OF THE INVENTION

The present disclosure relates to a method and system for repairing a component, such as a turbine component, using a confined laser drill.

BACKGROUND OF THE INVENTION

Turbines are widely used in industrial and commercial operations. A typical commercial steam or gas turbine used to generate electrical power includes alternating stages of stationary and rotating airfoils. For example, stationary vanes may be attached to a stationary component such as a casing that surrounds the turbine, and rotating blades may be attached to a rotor located along an axial centerline of the turbine. A compressed working fluid, such as but not limited to steam, combustion gases, or air, flows through the turbine, and the stationary vanes accelerate and direct the compressed working fluid onto the subsequent stage of rotating blades to impart motion to the rotating blades, thus turning the rotor and performing work.

An efficiency of the turbine generally increases with increased temperatures of the compressed working fluid. However, excessive temperatures within the turbine can reduce the longevity of the airfoils in the turbine and thus increase repairs, maintenance, and outages associated with the turbine. As a result, various designs and methods have been developed to provide cooling to the airfoils. For example, a cooling media can be supplied to a cavity inside the airfoil to convectively and/or conductively remove heat from the airfoil. In particular embodiments, the cooling media can flow out of the cavity through cooling passages in the airfoil to provide film cooling over the outer surface of the airfoil.

As temperatures and/or performance standards continue to increase, the materials used for the airfoil become increasingly thin, making reliable manufacture of the airfoil increasingly difficult. For example, certain airfoils are cast from a high alloy metal, with a thermal barrier coating applied to the outer surface of such airfoils to enhance thermal protection. Through continued use, however, the cooling holes in the airfoils can become clogged with debris or other contaminates and the thermal barrier coating can become worn down or chipped. Additionally, in certain cases, the airfoil can undergo plastic deformation such that the location and/or orientation of the holes may change from an original location and/or orientation.

Certain airfoils can be repaired to address the above issues. However, it is generally an expensive and time consuming process to correctly clear out each of the cooling holes and re-apply a thermal barrier coating. Accordingly, a system and method for determining the locations and/or orientations of each of the cooling holes would be useful. Further, a system and method for both determining which, if any, of the cooling holes are clogged and for removing any debris would be particularly beneficial.

BRIEF DESCRIPTION OF THE INVENTION

Aspects and advantages of the invention are set forth below in the following description, or may be obvious from the description, or may be learned through practice of the invention.

In one exemplary aspect of the present disclosure, a method is provided for repairing one or more holes in a near wall of a component. The method includes receiving original hole information of a first hole in the near wall of the component. The original hole information of the first hole includes an original location of the first hole and an original vector of the first hole. The method also includes directing a confined laser beam of a confined laser drill, the confined laser beam defining a beam axis, towards the near wall of the component at the original location of the first hole and along the original vector of the first hole such that the beam axis of the confined laser beam is substantially aligned with the original vector of the first hole. The method also includes sensing a characteristic of light reflected from the original location first hole, and determining a repair status of the first hole using the sensed characteristic of light reflected from the original location of the first hole.

In one exemplary embodiment of the present disclosure, a system is provided for repairing one or more holes in a near wall of a component. The system includes a confined laser drill utilizing a confined laser beam defining a beam axis, and a sensor positioned to sense a characteristic of light reflected from a first hole in the near wall of the component. The system also includes a controller operably connected to the confined laser drill and the sensor. The controller is configured to receive original hole information of the first hole in the near wall of the component. The original hole information of the first hole includes an original location of the first hole and an original vector of the first hole. The controller is also configured to direct the confined laser beam towards the near wall of the component at the original location of the first hole and along the original vector of the first hole. The controller is also configured to determine a repair status of the first hole based on a characteristic of light reflected from the first hole and sensed by the sensor.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

DETAILED DESCRIPTION OF THE INVENTION

Figure 1:
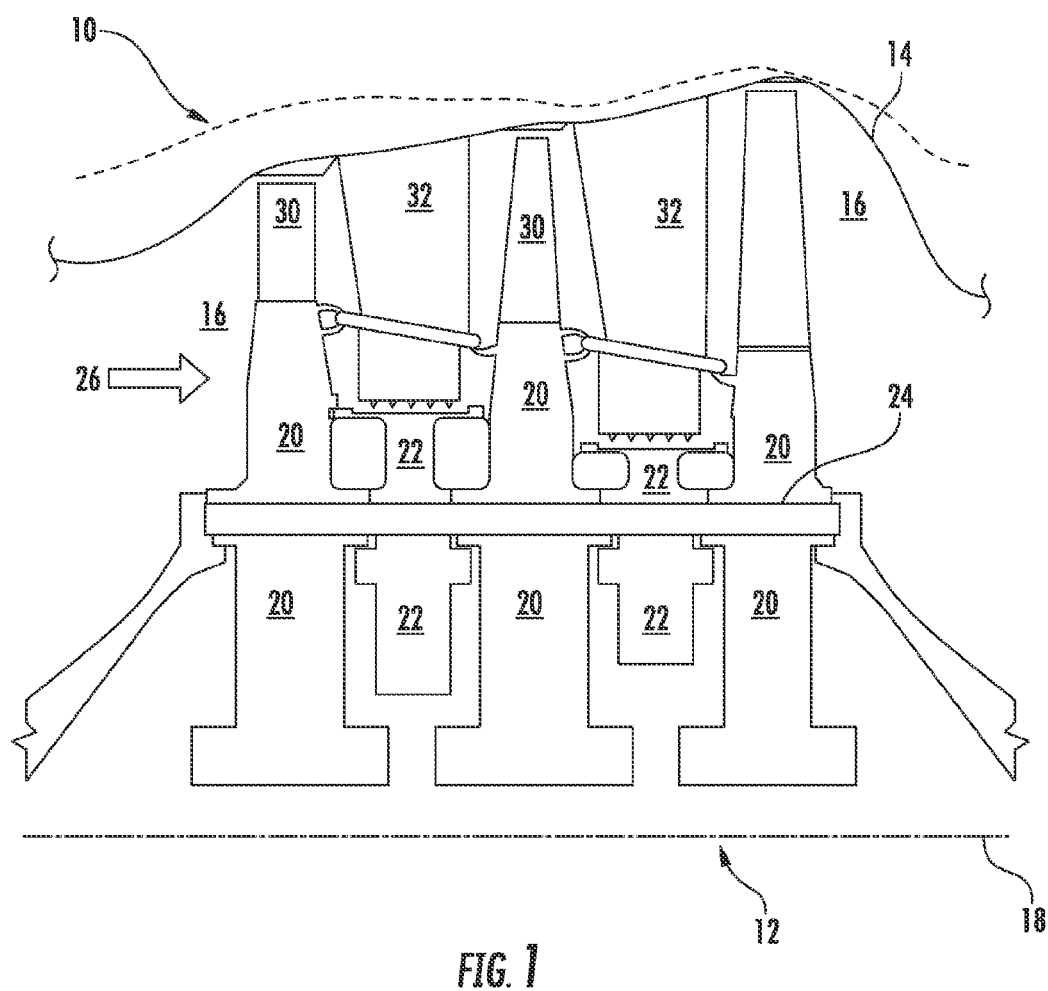
FIG. 1 is a simplified cross-sectional view of a turbine section of an exemplary gas turbine that may incorporate various embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present disclosure will be described generally in the context of manufacturing an airfoil for a turbomachine for purposes of illustration, one of ordinary skill in the art will readily appreciate that embodiments of the present disclosure may be applied to other articles of manufacture and are not limited to a system or method for manufacturing an airfoil for a turbomachine unless specifically recited in the claims. For example, in other exemplary embodiments, aspects of the present disclosure may be used to manufacture an airfoil for use in the aviation context, to manufacture other components of a gas turbine, and/or to manufacture an airfoil or other component in a steam turbine.

As used herein, the terms "first", "second", and "third" may be used interchangeably to distinguish one component from another and are not intended to signify location or importance of the individual components. Similarly, the terms "near" and "far" may be used to denote relative position of an article or component and are not intended to signify any function or design of said article or component.

Referring now to the drawings, FIG. 1 provides a simplified side cross-section view of an exemplary turbine section 10 of a gas turbine according to various embodiments of the present disclosure. As shown in FIG. 1, the turbine section 10 generally includes a rotor 12 and a casing 14 that at least partially define a gas path 16 through the turbine section 10. The rotor 12 is generally aligned with an axial centerline 18 of the turbine section 10 and may be connected to a generator, a compressor, or another machine to produce work. The rotor 12 may include alternating sections of rotor wheels 20 and rotor spacers 22 connected together by a bolt 24 to rotate in unison. The casing 14 circumferentially surrounds at least a portion of the rotor 12 to contain a compressed working fluid 26 flowing through the gas path 16. The compressed working fluid 26 may include, for example, combustion gases, compressed air, saturated steam, unsaturated steam, or a combination thereof.

As shown in FIG. 1, the turbine section 10 further includes alternating stages of rotating blades 30 and stationary vanes 32 that extend radially between the rotor 12 and the casing 14. The rotating blades 30 are circumferentially arranged around the rotor 12 and may be connected to the rotor wheels 20 using various means. In contrast, the stationary vanes 32 may be peripherally arranged around the inside of the casing 14 opposite from the rotor spacers 22. The rotating blades 30 and stationary vanes 32 generally have an airfoil 38 shape, with a concave pressure side, a convex suction side, and leading and trailing edges, as is known in the art. The compressed working fluid 26 flows along the gas path 16 through the turbine section 10 from left to right as shown in FIG. 1. As the compressed working fluid 26 passes over the first stage of rotating blades 30, the compressed working fluid expands, causing the rotating blades 30, rotor wheels 20, rotor spacers 22, bolt 24, and rotor 12 to rotate. The compressed working fluid 26 then flows across the next stage of stationary vanes 32 which accelerate and redirect the compressed working fluid 26 to the next stage of rotating blades 30, and the process repeats for the following stages. In the exemplary embodiment shown in FIG. 1, the turbine section 10 has two stages of stationary vanes 32 between three stages of rotating blades 30; however, one of ordinary skill in the art will readily appreciate that the number of stages of rotating blades 30 and stationary vanes 32 is not a limitation of the present disclosure unless specifically recited in the claims.

Figure 2:
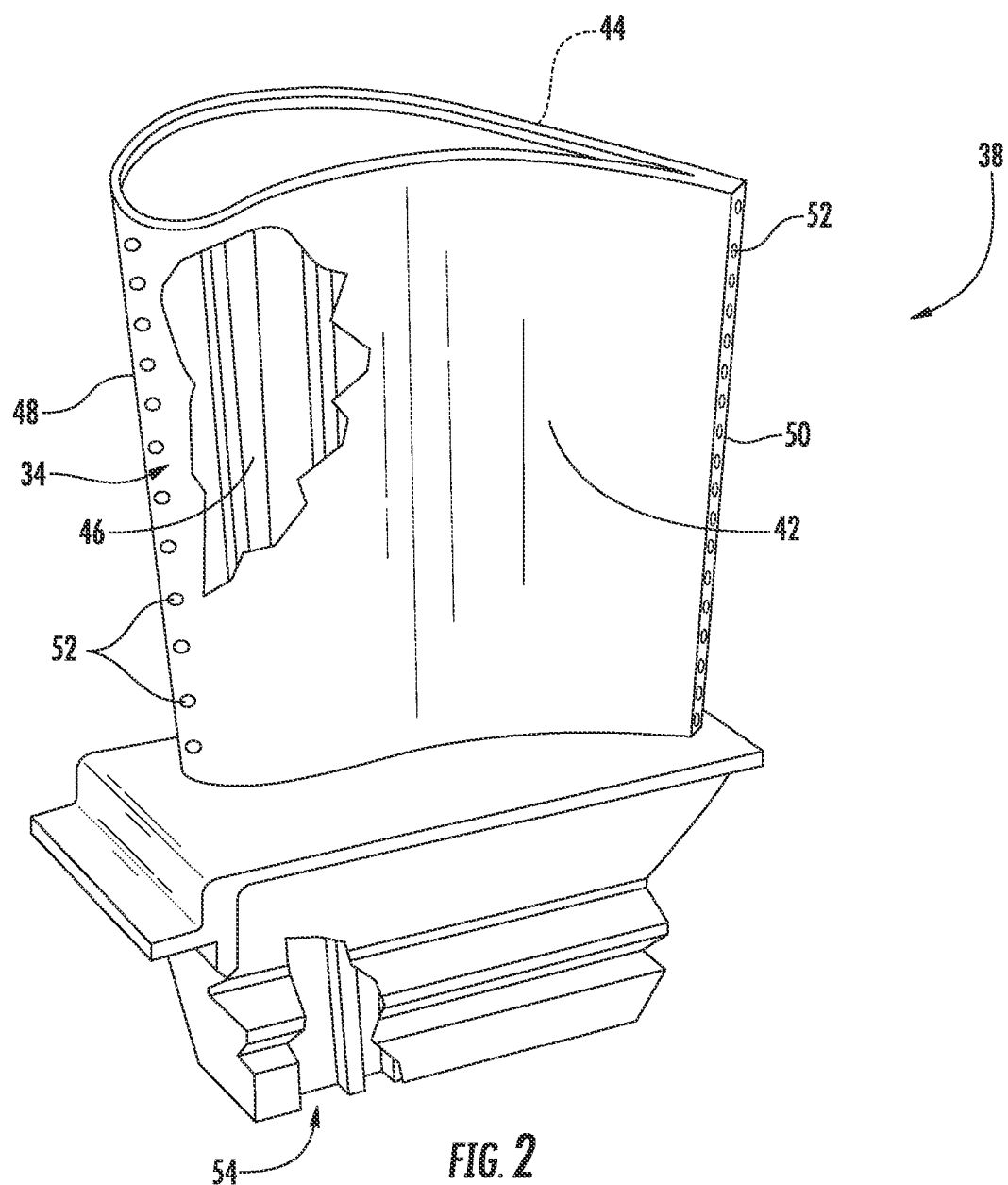
FIG. 2 is a perspective view of an exemplary airfoil according to an embodiment of the present disclosure.

FIG. 2 provides a perspective view of an exemplary airfoil 38, such as may be incorporated into the rotating blades 30 or stationary vanes 32, according to an embodiment of the present disclosure. As shown in FIG. 2, the airfoil 38 generally includes a pressure side 42 having a concave curvature and a suction side 44 opposed to the pressure side 42 having a convex curvature. The pressure and suction sides 42, 44 are separated from one another to define a cavity 46 inside the airfoil 38 between the pressure and suction sides 42, 44. The cavity 46 may provide a serpentine or tortuous path for a cooling media to flow inside the airfoil 38 to conductively and/or convectively remove heat from the airfoil 38. In addition, the pressure and suction sides 42, 44 further join to form a leading edge 48 at an upstream portion of the airfoil 38 and a trailing edge 50 at a downstream portion of the airfoil 38. A plurality of cooling passages 52 in the pressure side 42, suction side 44, leading edge 48, and/or trailing edge 50 may provide fluid communication with the cavity 46 through the airfoil 38 to supply the cooling media over an outer surface 34 of the airfoil 38. As shown in FIG. 2, for example, the cooling passages 52 may be located at the leading and trailing edges 48, 50 and/or along either or both of the pressure and suction sides 42, 44. The exemplary airfoil 38 further defines an opening 54 at a base and of the airfoil 38 wherein cooling media, such as compressed air from a compressor section of the gas turbine, may be provided to the cavity 46.

One of ordinary skill in the art will readily appreciate from the teachings herein that the number and/or location of the cooling passages 52 may vary according to particular embodiments, as may the design of the cavity 46 and the design of the cooling passages 52. Accordingly, the present disclosure is not limited to any particular number or location of cooling passages 52 or to any specific cooling passage 52 or cavity 46 design unless specifically recited in the claims.

In certain exemplary embodiments, a wall of the airfoil 38 may include a thermal barrier coating 36 applied over at least a portion of an outer surface 34 of a metal portion 40 of the airfoil 38 (see FIG. 3), covering the underlying metal portion 40 of the airfoil 38. The thermal barrier coating 36, if applied, may include low emissivity or high reflectance for heat, a smooth finish, and/or good adhesion to the underlying outer surface 34.

Part 1

Figure 3:
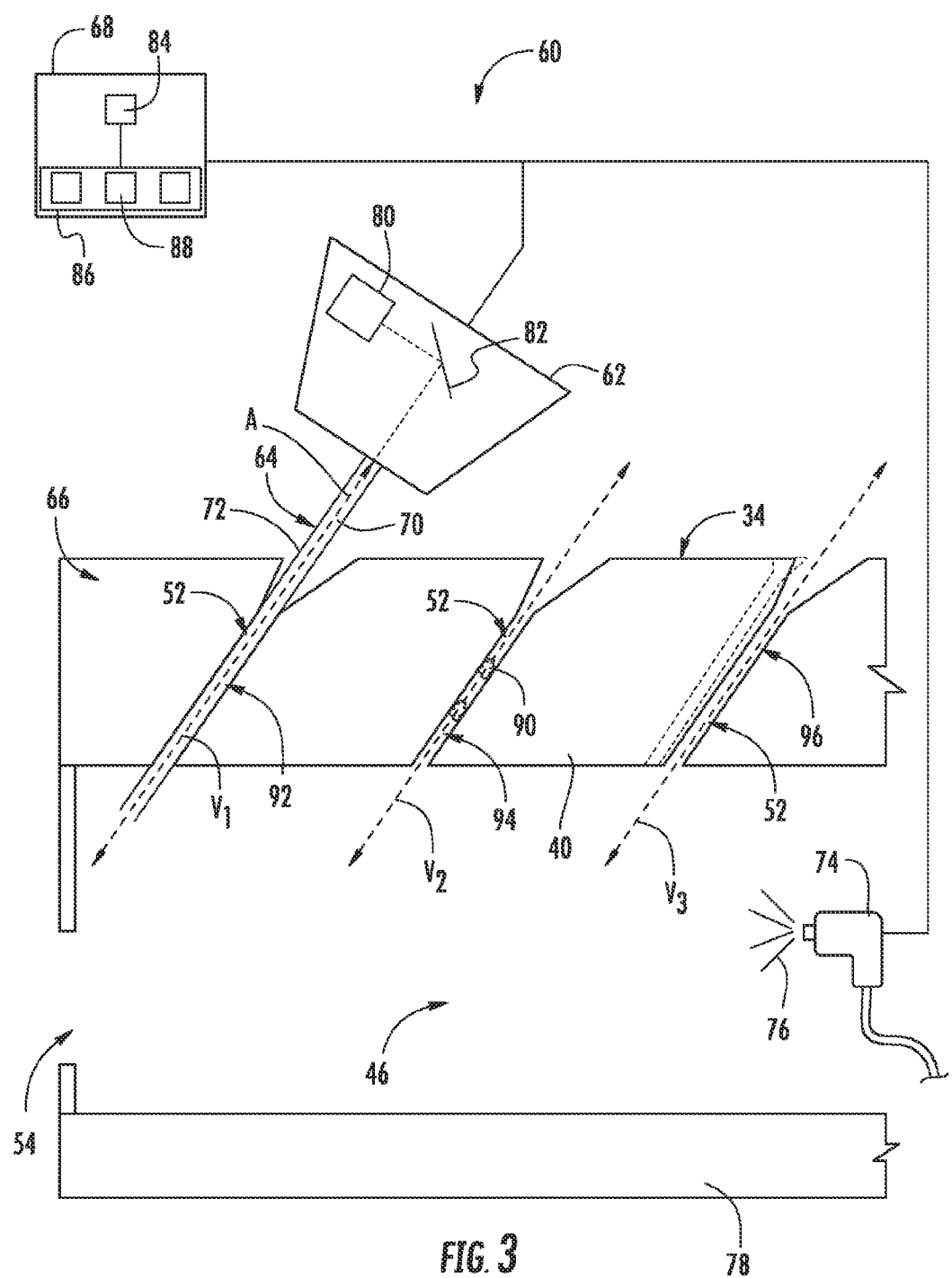
FIG. 3 is a schematic view of a system for repairing an airfoil according to an exemplary embodiment of the present disclosure.

Referring now to FIG. 3, a schematic view of an exemplary system 60 of the present disclosure is provided. The system 60 may be used in, for example, repairing a component for a gas turbine. More particularly, for the embodiment depicted, the system 60 is used for repairing one or more holes or cooling passages 52 in an airfoil 38 of a gas turbine, such as the airfoil 38 discussed above with reference to FIG. 2. It should be appreciated, however, that although the system 60 is described herein in the context of repairing the airfoil 38, in other exemplary embodiments, the system 60 may be used in repairing any other suitable component for a gas turbine. For example, the system 60 may be used in repairing transition pieces, nozzles, combustion liners, effusion or impingement plates, vanes, shrouds, or any other suitable part.

Exemplary system 60 generally includes a confined laser drill 62 configured to direct a confined laser beam 64 towards a near wall 66 of the airfoil 38. The confined laser beam 64 defines a beam axis A. The near wall 66 of the airfoil 38 is positioned adjacent to the cavity 46 of the airfoil. Various embodiments of the confined laser drill 62 may generally include a laser mechanism and a collimator (not shown). As is discussed in greater detail below, the system 60 further includes a controller 68 in operable communication with the confined laser drill 62. The laser mechanism may include any device capable of generating a laser beam 70 and the collimator may be any device configured to reshape a diameter of the beam 70 to achieve a better focus feature when the beam 74 is being focused into a different media, such as a glass fiber or water. Accordingly, as used herein, the collimator includes any device that narrows and/or aligns a beam of particles or waves to cause the spatial cross section of the beam to become smaller. For example, in certain embodiments, the collimator may receive the laser beam 70 along with a fluid, such as deionized or filtered water. An aperture or nozzle may then direct the laser beam 70 inside a liquid column 72 toward the airfoil 38. The liquid column 72 may have a pressure of approximately 2,000 to 3,000 pounds per square inch. However, the present disclosure is not limited to any particular pressure for the liquid column 72 unless specifically recited in the claims. Additionally, it should be appreciated, that as used herein, terms of approximation, such as "about" or "approximately," refer to being within a ten percent margin of error.

The liquid column 72 may be surrounded by a protection gas, such as air, and act as a light guide and focusing mechanism for laser beam 70. Accordingly, liquid column 72 and laser beam 70 may together form the confined laser beam 64 utilized by the confined laser drill 62 and directed at the airfoil 38. As is discussed in greater detail below, the confined laser beam 64 may be utilized by the confined laser drill 62 in repairing the one or more cooling passages 52 in the near wall 66 of the airfoil 38.

With continued reference to FIG. 3, the system 60 further includes an exemplary backstrike protection mechanism 74. Exemplary backstrike protection mechanism 74 depicted includes a gas 76 flowing inside the airfoil 38. As used herein, the term "gas" may include any gaseous media. For example, the gas 76 may be an inert gas, a vacuum, a saturated steam, a superheated steam, or any other suitable gas that may form a gaseous flow inside cavity 46 of the airfoil 38. Gas 76 flowing inside airfoil 38 may have a pressure roughly commensurate with the pressure of the liquid of liquid column 72, or any other pressure sufficient to disrupt confined laser beam 64. More particularly, gas 76 may have any other pressure sufficient to generate a sufficient kinetic moment or speed to disrupt liquid column 72 within the cavity 46 of the airfoil 38. For example, in certain exemplary embodiments, gas 76 flowing inside the airfoil 38 may have a pressure greater than approximately twenty-five pounds per square inch, although the present disclosure is not limited to any particular pressure for the gas 76 unless specifically recited in the claims. In this manner, gas 76 prevents confined laser beam 64 from striking an inside surface of the cavity 46 of the airfoil 38 opposite from the cooling passages 52 in the near wall 66. More particularly, gas 76 prevents confined laser beam 64 from striking a far wall 78 of the airfoil 38 after the confined laser beam has broken through the near wall of the airfoil.

As used herein, the term "breakthrough," "breaking through," and cognates thereof refer to when confined laser beam 64 extends continuously and uninterruptedly through the near wall 66 of the airfoil 38 along beam axis A of confined laser beam 64. Subsequent to any breakthrough of confined laser beam 64 through near wall 66 of airfoil 38, at least a portion of said confined laser beam 64 may pass therethrough into, for example, the cavity 46 of the airfoil 38.

The exemplary system 60 of FIG. 3 additionally includes a sensor 80 operably connected with the controller 68. The sensor 80 may be an optical sensor configured to sense a characteristic of light and send a signal to the controller 68 indicative of the sensed characteristic of light. Further, for the exemplary embodiment depicted, the sensor 80 is positioned to sense a characteristic of light directed along the beam axis A away from the near wall 66 of the airfoil 38, e.g., reflected and/or redirected light from the cooling passage 52. In certain exemplary embodiments, the sensor 80 may be an oscilloscope sensor suitable for sensing one or more of the following characteristics of light: an intensity of light, one or more wavelengths of light, an amount of light, a reflected pulse width, a reflected pulse rate, a shape of a light pulse in time, and a shape of a light pulse in frequency.

Moreover, for the embodiment depicted, the sensor 80 is offset from the beam axis A and is configured to sense a characteristic of reflected light along the beam axis A by redirecting at least a portion of the reflected light with a redirection lens 82. Redirection lens 82 is positioned in the beam axis A, i.e., intersecting the beam axis A, at approximately a forty-five degree angle with the beam axis A. However, in other exemplary embodiments, redirection lens 82 may define any other suitable angle with respect to the beam axis A. Additionally, redirection lens 82 may include a coating on a first side (i.e., the side closest to near wall 66 of airfoil 38) which redirects at least a portion of the reflected light traveling along the beam axis A away from the near wall 66 of the airfoil 38 to the sensor 80. The coating may be what is referred to as a "one-way" coating such that substantially no light traveling along the beam axis towards the near wall 66 of the airfoil 38 is redirected by the lens or its coating. For example, in certain embodiments, the coating may be an electron beam coating ("EBC") coating.

It should be appreciated, however, that in other exemplary embodiments, the sensor 80 may instead be positioned in the beam axis A, and the laser beam 70 may be redirected. Alternatively, the sensor 80 may be positioned offset from the beam axis A outside the airfoil 38 and configured to sense a characteristic of light from the hole 52 by defining a line of sight with the hole 52. In still other embodiments, one or more additional sensors (not shown) may be positioned within the cavity 46, or alternatively outside the opening 54 of the cavity 46 and directed into the cavity 46. It should further be appreciated that in still other embodiments, the sensor 80 may actually be a plurality of sensors positioned at any suitable location inside the cavity 46 and/or outside the airfoil 38.

Referring still to the exemplary system 60 of FIG. 3, the controller 68 may be any suitable processor-based computing device, and may be in operable communication with, e.g., the confined laser drill 62, the sensor 80, and the backstrike protection mechanism 74. For example, suitable controllers 68 may include one or more personal computers, mobile phones (including smart phones), personal digital assistants, tablets, laptops, desktops, workstations, game consoles, servers, other computers and/or any other suitable computing devices. As shown in FIG. 3, the controller 68 may include one or more processors 84 and associated memory 86. The processor(s) 84 may generally be any suitable processing device(s) known in the art. Similarly, the memory 86 may generally be any suitable computer-readable medium or media, including, but not limited to, RAM, ROM, hard drives, flash drives, or other memory devices. As is generally understood, the memory 86 may be configured to store information accessible by the processor(s) 84, including instructions or logic 88 that can be executed by the processor(s) 84. The instructions or logic 88 may be any set of instructions that when executed by the processor(s) 84 cause the processor(s) 84 to provide a desired functionality. For instance, the instructions or logic 88 can be software instructions rendered in a computer-readable form. When software is used, any suitable programming, scripting, or other type of language or combinations of languages may be used to implement the teachings contained herein. In particular embodiments of the present disclosure, for example, the instructions or logic 88 may be configured to implement one or more of the methods described below with reference to FIG. 6, 9, or 10. Alternatively, the instructions can be implemented by hard-wired logic 88 or other circuitry, including, but not limited to application-specific circuits. Moreover, although controller 68 is depicted schematically separate from sensor 80, in other exemplary embodiments, sensor 80 and controller 68 may be integrated into a single device positioned at any suitable location.

In order to repair an airfoil, it may be necessary to deduce certain information regarding the one or more cooling holes 52 in the airfoil 38. For the embodiment of FIG. 3, the exemplary system 60 is configured to deduce certain information regarding the one or more holes 52 in the airfoil 38 using the confined laser drill 62 and the sensor 80 to determine a repair status of the one or more holes 52. More particularly, the exemplary system 60 is configured to determine a location of each hole 52, a vector of each hole 52, and whether or not such hole 52 is clogged.

For example, referring still to FIG. 3, the system 60 is configured to determine a material into which the confined laser beam 64 is being directed based on the characteristic of light sensed by the sensor 80. In certain embodiments, the characteristic of light sensed by the sensor 80 may be one or more wavelengths of light reflected during drilling operations. Different materials absorb and reflect light from the confined laser beam 64 at different wavelengths. Accordingly, the reflected light sensed by the sensor 80 during drilling operations may define a wavelength or a pattern of wavelengths indicative of the material into which the confined laser beam 64 is directed. For example, light sensed by the sensor 80 when drilling into the metal portion 40 of an airfoil 38 may define a pattern of wavelengths that is distinct from a pattern of wavelengths defined by light sensed by the sensor 80 when drilling into debris 90 positioned in the one or more cooling holes 52, which may in turn be distinct from a pattern of wavelengths defined by the light sensed by the sensor 80 when the confined laser beam is passing completely through the near wall 66 of the airfoil 38 and is not being directed into the metal portion 40 of the airfoil 38. It should be appreciated, however, that in other exemplary embodiments, the characteristic of light sensed by the sensor may additionally, or alternatively, include any other characteristic indicative of a material into which confined laser beam is being directed.

Accordingly, in certain embodiments, the exemplary system 60 may deduce certain information of the one or more holes 52 using the confined laser beam 64 of the confined laser drill 62 essentially as a probe. More particularly, in certain embodiments, the controller 68 may receive original hole information of the one or more cooling holes 52 in the airfoil 38. The original hole information may include an original location of the one or more holes 52 and original vector of the one or more holes 52. Such original hole information may be received in the form of an original design file, such as a CAD design file, or any other suitable format.

As is depicted in FIG. 3, the controller 68 may direct the confined laser beam 64 of the confined laser drill 62 at an original location of a first hole 92 and along an original vector of the first hole 92. Notably, the confined laser drill 62 may be operating at a reduced power level to reduce a risk of damaging the near wall 66 of the airfoil 38. For the embodiment depicted, the first hole 92 is in the original location and defines a vector $V_1$ that is unchanged from the original vector. Additionally, for the embodiment depicted, no debris 90 is present in the first hole 92. Accordingly, when the confined laser beam 64 of the confined laser drill 62 is directed at the original location of the first hole 92 and along the original vector the first hole 92, the confined laser beam 64 passes completely through the near wall 66 of the airfoil 38 such that the confined laser beam 64 is not directed into the near wall 66 the airfoil 38. The system 60 may determine that the confined laser beam 64 is passing completely through the near wall 66 the airfoil 38 (e.g., based on the characteristic of light sensed by the sensor 80) and therefore determine the first hole 92 is complete and unclogged and may confirm the original location and original vector of the first hole 92. It should be appreciated, that as used herein, determining a material into which the confined laser beam 64 is being directed includes determining that confined laser beam 64 is not being directed into any material of the near wall 66 and instead is passing completely through the near wall 66, i.e, passing completely through a hole in the near wall 66.

Figure 4:
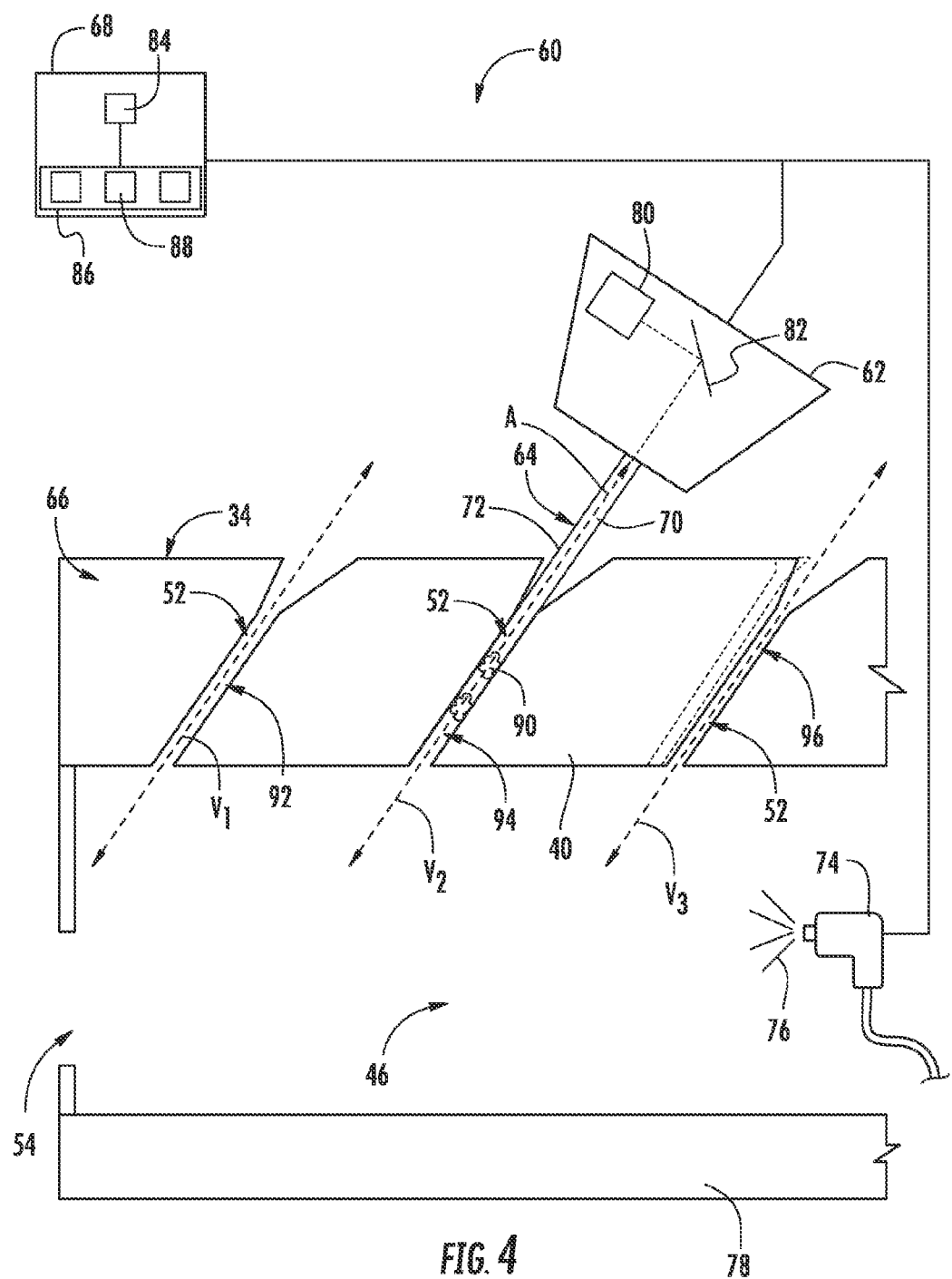
FIG. 4 is another schematic view of the exemplary system of FIG. 3.

By contrast, referring now to FIG. 4, the confined laser beam 64 of the confined laser drill 62 is directed at an original location of a second hole 94 and along an original vector of the second hole. The location of the second hole 94 is the same as the original location of the second hole 94 and a vector $V_2$ defined by the second hole 94 is the same as the original vector of the second hole 94. However, in the embodiment depicted, debris 90 is positioned in the second hole 94, such that the confined laser beam 64 does not pass completely through the near wall 66 of the airfoil 38 at the second hole 94. The system 60 may determine the confined laser beam 64 is being directed into debris 90 based on the characteristic of light sensed by the sensor 80. In response, the system 60 may increase a power of the confined laser drill 62 such that the confined laser beam 64 of the confined laser drill 62 ablates the debris 90, i.e., drills through the debris 90. Once the confined laser drill 62 has drilled through the debris 90, and the confined laser beam 64 has passed completely through the near wall 66 the airfoil 38 and is not being directed into the near wall 66 the airfoil 38, the system 60 may determine the second hole 94 is complete and unclogged and may confirm the original location and original vector of the second hole 94.

Figure 5:
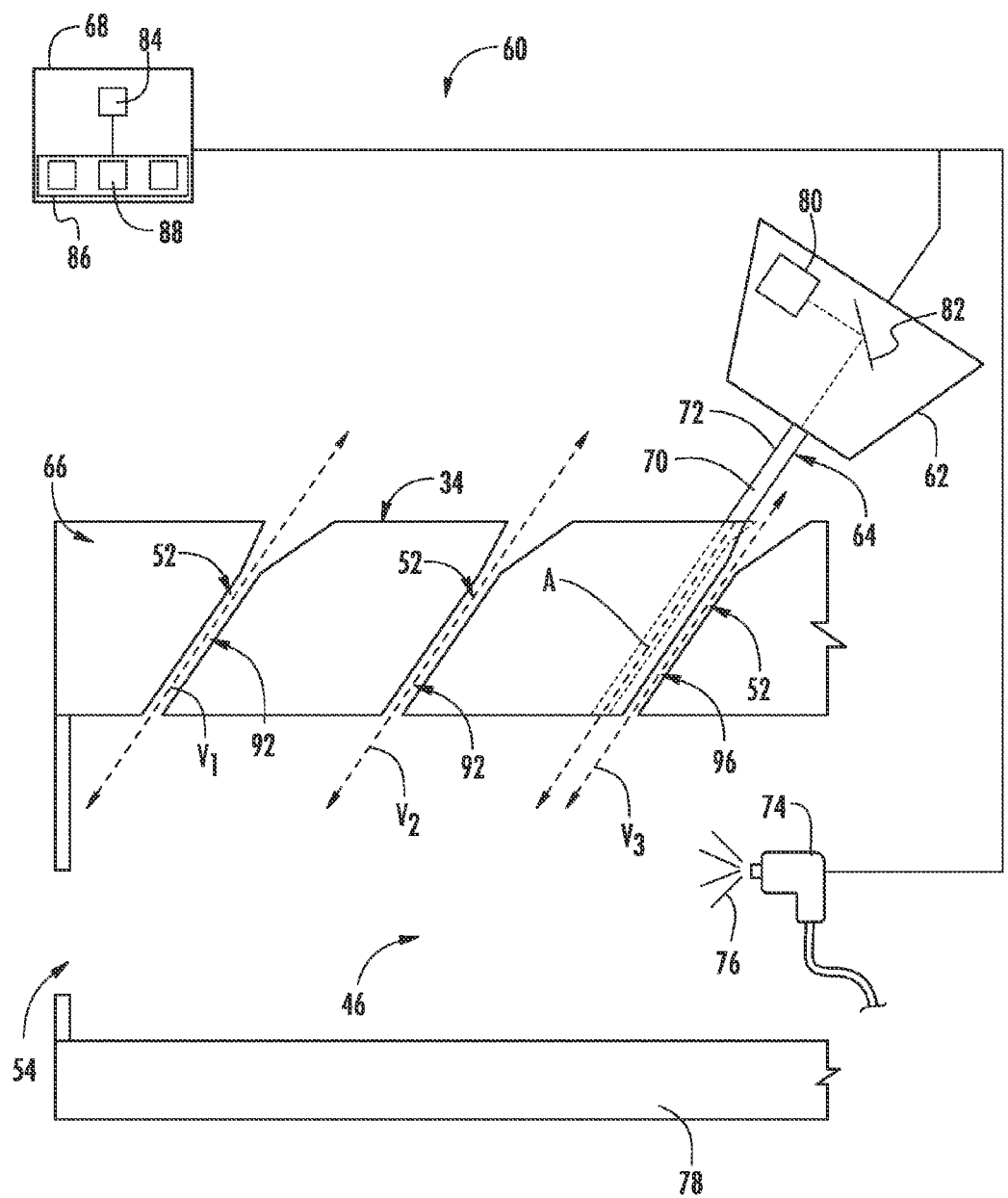
FIG. 5 is yet another schematic view of the exemplary system of FIG. 3.

Referring now to FIG. 5, the confined laser beam 64 of the confined laser drill 62 is directed at the original location of a third hole 96 and along an original vector of the third hole 96. For the embodiment depicted, however, the near wall 66 of the airfoil 38 has undergone plastic deformation such that the third hole 96 in the near wall 66 is no longer in its original location and a vector $V_3$ of the third hole 96 no longer extends along its original vector (original hole shown in phantom). Accordingly, when the confined laser beam 64 of the confined laser drill 62 is directed at the original location of the third hole 96 and along the original vector of the third hole 96, the system 60 may determine the confined laser beam 64 is being directed at least partially into the near wall 66 of the airfoil 38. In certain embodiments, the system 60 may flag the hole 96 for manual inspection, or alternatively may perform a searching or repair subroutine designed to determine a new location and a new vector of the third hole 96. Such a repair subroutine may, for example, move in a spiral-shaped pattern around the original location of the third hole 96 until it is determined the confined laser beam 64 of the confined laser drill 62 has passed completely through the near wall 66 of the airfoil 38, or is being directed into debris 90 positioned in the third hole 96. At such point, the system 60 may determine the new hole information for the third hole 96.

Figure 6:
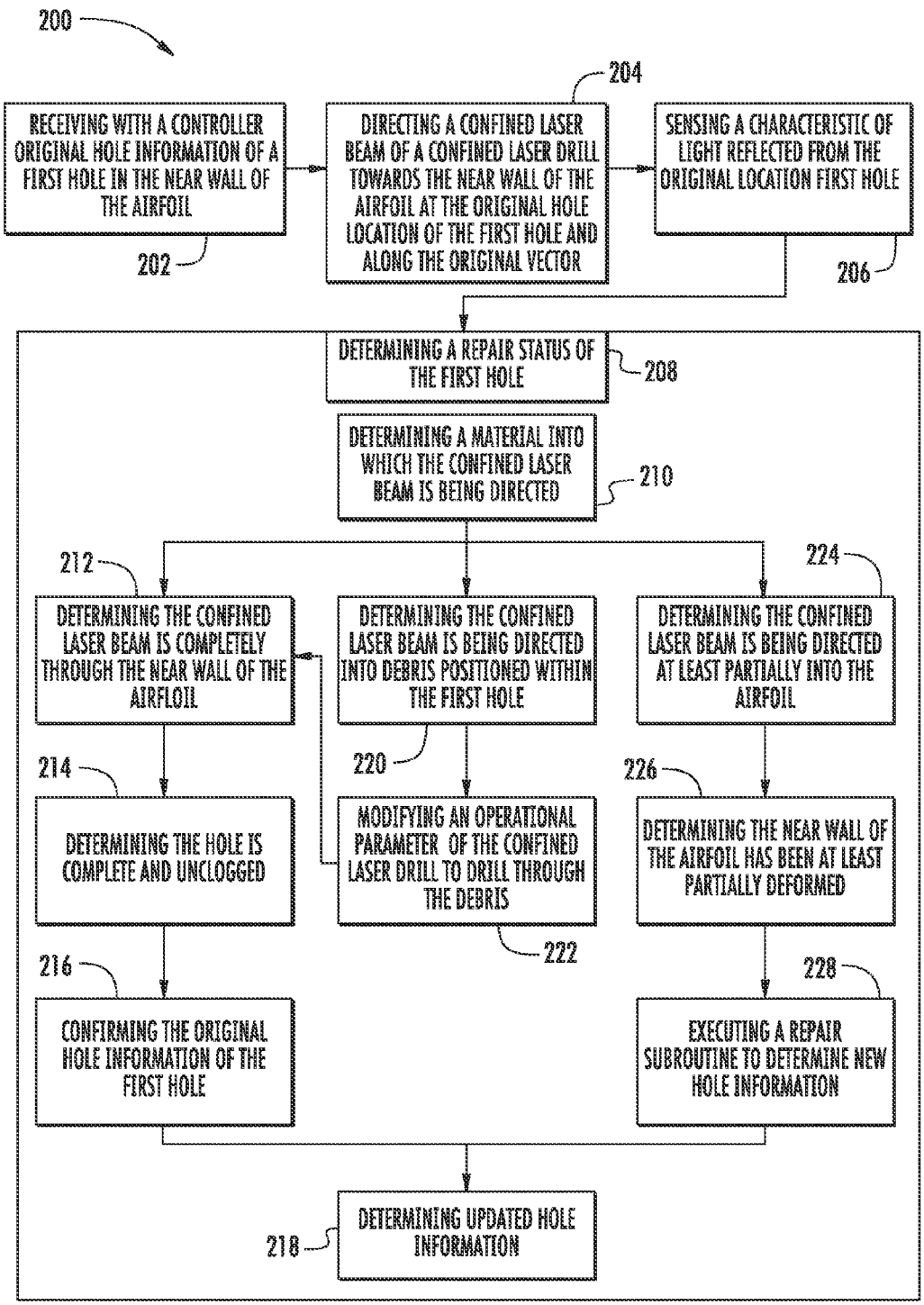
FIG. 6 is a flow diagram of a method for repairing an airfoil according to an exemplary aspect of the present disclosure.

Referring now to FIG. 6, a flow diagram is provided of an exemplary method (200) of repairing one or more holes in a near wall of a airfoil, such as the airfoil depicted in FIG. 2 and described above. The exemplary method (200) of FIG. 6 may be used in conjunction with the system 60 depicted in FIGS. 3 through 5 and described above. Accordingly, although the exemplary method (200) is described in the context of repairing an airfoil, the exemplary method (200) may additionally, or alternatively, be used in conjunction with repairing any other suitable components of a gas turbine.

The exemplary method (200) includes at (202) receiving with a controller original hole information of the first hole in the near wall of the airfoil. The original hole information of the first hole received at (202) includes an original location of the first hole and an original vector of the first hole. The exemplary method (200) further includes at (204) directing a confined laser beam of the confined laser drill toward the near wall of the airfoil at the original location of the first hole and along the original vector of the first hole. More particularly, in certain exemplary aspects, the confined laser beam may define a beam axis and directing the confined laser beam along the original vector of the first hole at (204) may include directing the confined laser beam along the original vector of the first hole such that the beam axis of the confined laser beam is aligned or substantially aligned with the original vector of the first hole.

The exemplary method (200) further includes at (206) sensing a characteristic of light reflected from the original location of the first hole. In certain exemplary aspects, sensing a characteristic of light at (206) may include sensing a characteristic of light indicative of a material, if any, into which the confined laser beam is being directed. For example, in certain exemplary aspects, sensing a characteristic of light at (206) may include sensing one or more wavelengths of light reflected from the original location of the first hole. It should be appreciated, however, that in other exemplary aspects, sensing a characteristic of light at (206) may additionally, or alternatively include sensing any other suitable characteristic(s) of light indicative of a material, if any, into which the confined laser beam is being directed.

The method (200) additionally includes at (208) determining a repair status of the first hole based on the characteristic of light sensed at (206). More particularly, for the embodiment depicted, determining a repair status the first hole at (208) includes at (210) determining a material, if any, into which the confined laser beam is being directed based on the characteristic of light sensed at (206).

In a first alternative of the exemplary aspect depicted, the first hole may be in the original location and may extend along the original vector. Additionally, the first hole may not include any debris or other contaminants clogging or otherwise blocking passage through the first hole. In such an alternative, determining a material, if any, into which the confined laser beam is being directed at (210) includes at (212) determining the confined laser beam is passing completely through the near wall of the airfoil at the first hole such that the confined laser beam is not being directed into the near wall of the airfoil. In response to determining the confined laser beam is passing completely through the near wall of the airfoil at (212), the method (200) further includes at (214) determining the hole is complete and unclogged and at (216) confirming the original hole information of the first hole.

Referring still to FIG. 6, and the first alternative, in response to confirming the original hole information of the first hole at (216), determining a repair status of the first hole at (208) further includes at (218) determining updated hole information. More particularly, the method includes at (218) determining an updated location of the first hole and an updated vector of the first hole. Notably, for the first alternative, the updated hole information is equal to the original hole information, i.e., the updated location of the first hole is equal to the original location of the first hole and the updated vector of the first hole is equal to the original vector of the first hole.

In a second alternative, however, the first hole may be in the original location and may extend along the original vector, but may include debris or other contaminants clogging or otherwise blocking passage through the first hole. Accordingly, determining the repair status of the first hole at (208), or more particularly, determining at (210) a material, if any, into which the confined laser beam is being directed includes at (220) determining the confined laser beam is being directed into debris positioned within the first hole. In response to determining the confined laser beam is being directed into debris positioned within the first hole at (220), the method (200) may further include at (222) modifying an operational parameter of the confined laser drill to drill through the debris positioned within the first hole in the near wall of the airfoil. For example, in certain exemplary aspects, modifying an operational parameter at (222) may include controlling the power of the confined laser drill to drill through the debris positioned within the first hole in the near wall of the airfoil. For example, modifying an operational parameter at (222) may include increasing a power of the confined laser drill, or alternatively may include decreasing a power of the confined laser drill. However, in other exemplary aspects, the exemplary method (200) may not include modifying an operational parameter at (222) and instead, for example, the drill may already be operating at a sufficient power level to drill through such debris. In still other exemplary aspects, however, the exemplary method (200) may not drill through the debris, and may instead flag the hole for manual inspection.

Referring still to the second alternative, once the confined laser beam has drilled through any and all debris positioned within the first hole, determining a repair status of the first hole at (208) further includes at (212) determining the confined laser beam of the confined laser drill is passing completely through the near wall of the airfoil. Similar to the first alternative discussed above, the exemplary method (200) subsequently includes at (214) determining the hole is complete and unclogged and at (216) confirming the original hole information of the first hole. Furthermore, the method (200) includes at (218) determining updated hole information. In such an alternative, the updated hole information is again equal to the original hole information.

Additionally, in a third alternative, the first hole may not be in the original location and/or may not extend along the original vector. In such an alternative, determining a material, if any, into which the confined laser beam is being directed at (210) includes at (224) determining the confined laser beam is being directed at least partially into the near wall of the airfoil (which may include, e.g., a metal portion of the airfoil and/or a coating on the metal portion of the airfoil). In response, determining a repair status the first hole at (208) additionally includes at (226) determining the near wall of the airfoil has been at least partially deformed and, for the exemplary aspect depicted, executing at (228) a searching or repair subroutine to determine new information the first hole. The new information of the first hole may include a new location of the first hole and a new vector of the first hole. The repair subroutine may, in certain aspects, move the confined laser drill in a spiral-shaped pattern about the original location of the first hole to determine the new location of the first hole and/or the new vector of the first hole. In such an alternative, determining a repair status the first hole at (208) may also include determining updated hole information at (218). In such an alternative, the updated hole information determined at (218) is equal to the new hole information determined at (228). More particularly, in such an alternative, an updated location of the first hole is equal to the new location of the first hole and an updated vector of the first hole is equal to the new vector of the first hole. Furthermore, in such an alternative, determining the updated hole information at (218) may additionally include updating hole information of one or more additional holes in view of the updated hole information of the first hole. More particularly, in such an alternative, the method (200) may estimate new hole information for one or more additional holes based on an amount of deformation of the component indicated by the new hole information of the first hole determined at (228).

It should be appreciated, however, that in other exemplary aspects, the method (200) may additionally or alternatively include, for example, flagging the first hole for manual review in response to determining at (224) the confined laser beam is being directed at least partially into the near wall of the airfoil and/or determining at (226) the near wall of the airfoil has been at least partially deformed. Further, in other exemplary aspects, the repair subroutine may include any other suitable method for determining new information of the first hole.

Although not depicted in FIG. 6, the exemplary method (200) may further include determining updated hole information for a plurality of cooling holes in the airfoil, such as all of the cooling holes in a near wall of an airfoil. Accordingly, the method (200) may further include receiving with the controller original hole information of a second hole in the near wall of the airfoil. The original hole information of the second hole may also include an original location of the second hole and an original vector of the second hole. The method (200) may further include directing the confined laser beam of the confined laser drill towards the near wall of the airfoil at the original location of the second hole and along the original vector of the second hole such that the beam axis of the confined laser beam is substantially aligned with the original vector of the second hole. The method (200) may further include sensing a characteristic of light reflected from the original location of the second hole and determining a repair status of the second hole based on the sensed characteristic of light reflected from the original location of the second hole. The method (200) may also include determining updated hole information of the second hole. Notably, in certain exemplary aspects, determining a repair status of the second hole may include any and all of the alternatives discussed above determining the repair status of the first hole at (208).

The exemplary method (200) depicted in FIG. 6 may assist in the repair of an airfoil. More particularly, clearing debris from the one or more cooling holes may allow such cooling holes to operate properly. Additionally, the information deduced may, e.g., facilitate additional steps in the repair process. For example, the information deduced using the exemplary method (200) may facilitate one or both of the exemplary method (300) described below with reference to FIG. 9 and the exemplary method (400) described below with reference to FIG. 10. Additionally, or alternatively, the information deduced using the exemplary method (200) may allow for a determination to be made whether or not additional repair is possible, or whether and to what extent additional repair of such an airfoil is necessary.

Moreover, although not depicted, the exemplary method (200) of FIG. 6 may further include moving the confined laser drill to the locations of additional holes and repeating the processes discussed herein determine updated hole information for each of the respective additional holes.

Part 2

Figure 7:
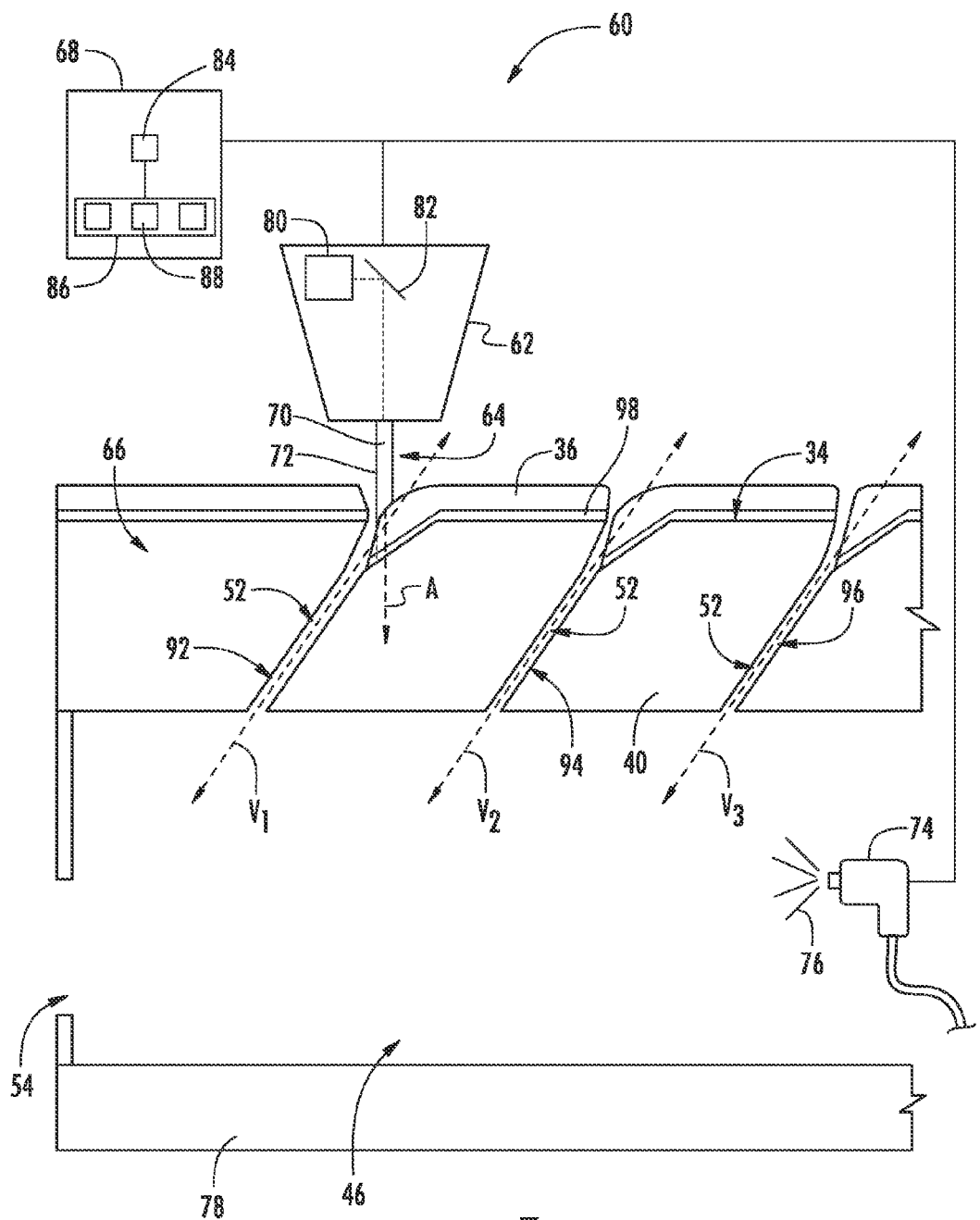
FIG. 7 is a schematic view of a system for repairing an airfoil according to another exemplary embodiment of the present disclosure.

Referring now to FIG. 7, a schematic view of an exemplary system 60 is provided for repairing one or more holes 52 in a near wall 66 of an airfoil 38 of a gas turbine. The exemplary system 60 depicted in FIG. 7 may be configured to work in conjunction with the exemplary system 60 of FIG. 3 and may be configured in substantially the same manner as exemplary system 60 of FIG. 3. Accordingly, the same or similar numbering may refer to the same or similar parts.

For example, the exemplary system 60 of FIG. 7 includes a confined laser drill 62 utilizing a confined laser beam 64, a sensor 80, and a controller 68 operably connected to the confined laser drill 62 and the sensor 80. As is depicted, the sensor 80 is positioned to sense a characteristic of light reflected along a beam axis A of the confined laser beam A away from the airfoil 38. For example, when the confined laser beam is directed at a first hole 92 in the near wall 66 of the airfoil 38, the sensor 80 is configured to sense light from an updated location of the first hole 92 in the near wall 66 of the airfoil 38.

The exemplary system 60 of FIG. 7 may be utilized subsequent to determining updated hole information of one or more of the cooling holes 52 in the near wall 66 of the airfoil 38. The updated hole information may include an updated location of the respective holes 52 and an updated vector of the respective holes 52. In certain embodiments, determining the updated hole information may be accomplished utilizing the exemplary method (200) described above with reference to FIG. 6, or alternatively using any other suitable method.

Moreover, the exemplary system 60 of FIG. 7 may be utilized subsequent to re-coating the outer surface 34 of the airfoil. Re-coating the outer surface 34 of the airfoil 38 may include adding one or more of a thermal barrier coating 36, bond coating 98, an environmental barrier coating (which may consist of multiple layers of different materials), or any other suitable coating. As is depicted, re-coating the outer surface 34 of the airfoil 38 includes coating at least a portion of the one or more holes 52 in the near wall 66 of the airfoil 38. Accordingly, subsequent to re-coating the outer surface 34 of the near wall 66 of the airfoil 38, the one or more holes 52 in the near wall 66 of the airfoil 38 may be at least partially covered by the coating and/or have coating positioned therein (as shown).

However, the exemplary system 60 of FIG. 7 is capable of removing the coating covering the one or more holes 52 and/or positioned in the one or more holes 52 without damaging the underlying metal portion 40 of the near wall 66 of the airfoil 38. More particularly, the exemplary system 60 of FIG. 7 is capable of determining the material into which the confined laser beam 64 of the confined laser drill 66 is being directed and/or determining a depth to which the confined laser beam 64 has drilled using the one or more characteristics of light sensed with the sensor 80.

For example, as discussed above, the sensor 80 may sense one or more characteristics of light indicative of the material into which the confined laser beam 64 of the confined laser drill 62 is being directed. For example, the sensor 80 may sense one or more wavelengths of light. The sensor 80 may additionally, or alternatively, sense one or more characteristics of light indicative of a depth to which the confined laser beam 64 of the confined laser drill 62 has drilled. For example, the sensor 80 may sense one or more of a reflected pulse rate, reflected pulse width, an intensity of light, an amount of noise in the intensity of light, or any other suitable characteristic. It should be appreciated, however, that in still other embodiments, the sensor 80 may additionally, or alternatively, sense any other suitable characteristics of light indicative of one or both of the material into which the confined laser beam 64 is being directed and a depth to which the confined laser beam 64 has drilled.

Accordingly, as is depicted in FIG. 7, the confined laser drill 62 may be positioned to direct the confined laser beam 64 over the first hole 92 in the near wall 66 of the airfoil 38 to remove the coating extending over and/or positioned in the first hole 92 in the near wall 66 of the airfoil 38. More particularly, the confined laser drill 62 may be moved to an updated location of the first hole 92 to drill through the coating extending over and/or positioned in the first hole 92 (as shown). Notably, the confined laser drill 62 may be positioned such that the beam axis A of the confined laser beam 64 does not extend substantially along a vector $V_1$ defined by the first hole 92, or more specifically, along an updated vector of the first hole. More particularly, for the embodiment depicted, the confined laser drill 62 is positioned such that the beam axis A of the confined laser beam 64 is substantially perpendicular to the outer surface 34 of metal portion 40 of the near wall 66. Such a configuration may allow for a more expedient repair process. It should be appreciated, however, that in other exemplary embodiments, the confined laser drill 62 may be positioned such that the beam axis A of the confined laser beam 64 extends along, or substantially along, the updated vector of the first hole 92.

Figure 8:
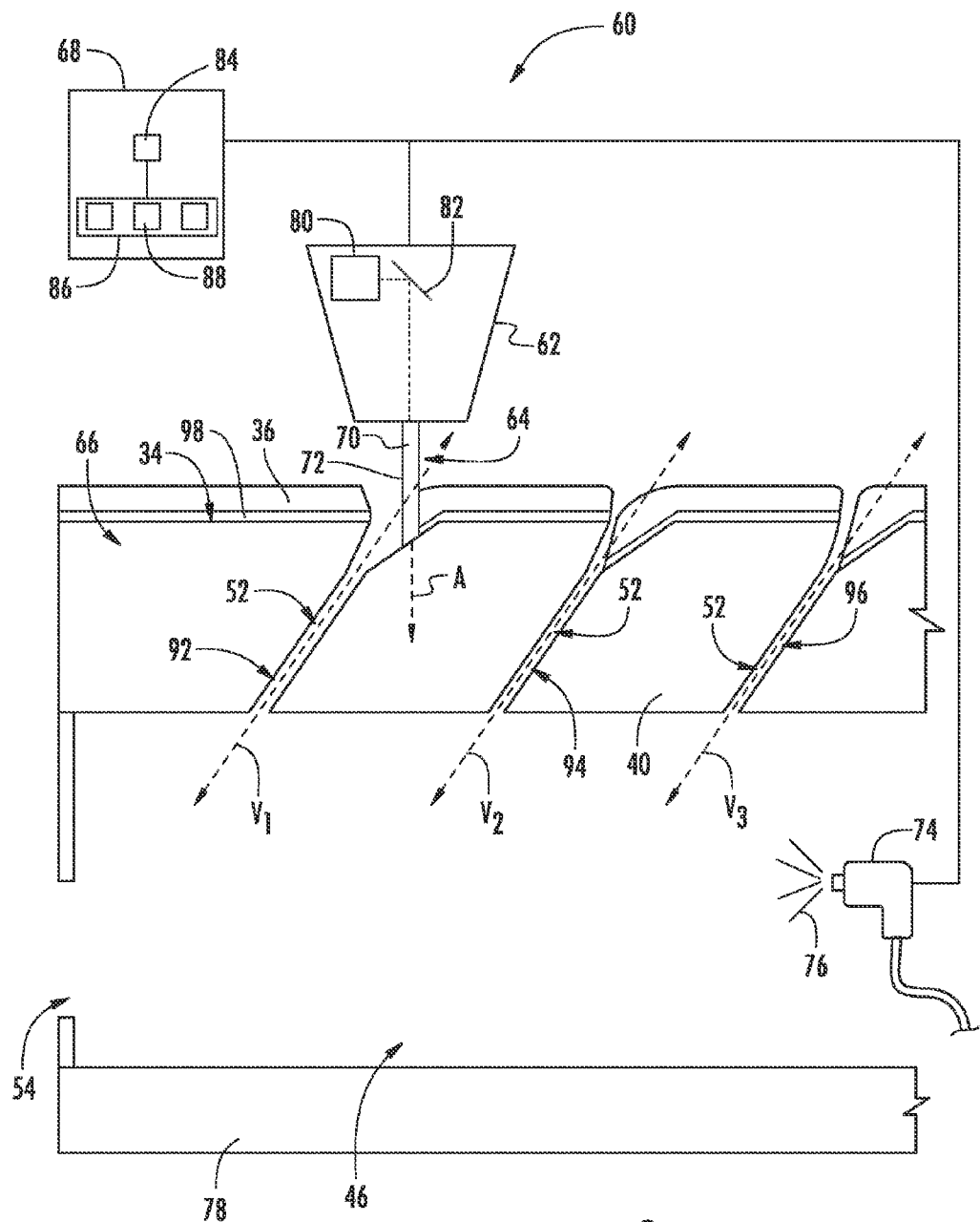
FIG. 8 is another schematic view of the exemplary system of FIG. 7.

Referring now to FIG. 8, the exemplary system 60 is depicted having drilled through the coating extending over and/or positioned in the first hole 92 in the near wall 66 of the airfoil 38. Based on the one or more characteristics of light sensed by the sensor 80, the system 60 may determine that the confined laser drill 62 has drilled through the coating extending over and/or positioned in the first hole 92 in the near wall 66 of the airfoil 38. The system 60 may then cease drilling operations to prevent unnecessary damage to the first hole 92 in the near wall 66 of the airfoil 38. Notably, however, in certain exemplary embodiments, an opening of the first hole 92 may be larger than a width of the confined laser beam 64. Accordingly, in such an exemplary embodiment, the system 60 may continue drilling—covering an entirety of the location of the first hole, i.e., an entirety of the opening of the first hole—until the entirety of the coating extending over and/or positioned in the opening of the first hole has been drilled through and removed.

Subsequent to completing removal of the coating extending over and/or positioned in the first hole, the exemplary system 60 may move to an updated location of the second hole 94, to an updated location of the third hole 96, etc. to remove the coating extending over and/or positioned in each of the plurality of cooling holes 52 in the near wall 66 of the airfoil 38.

Figure 9:
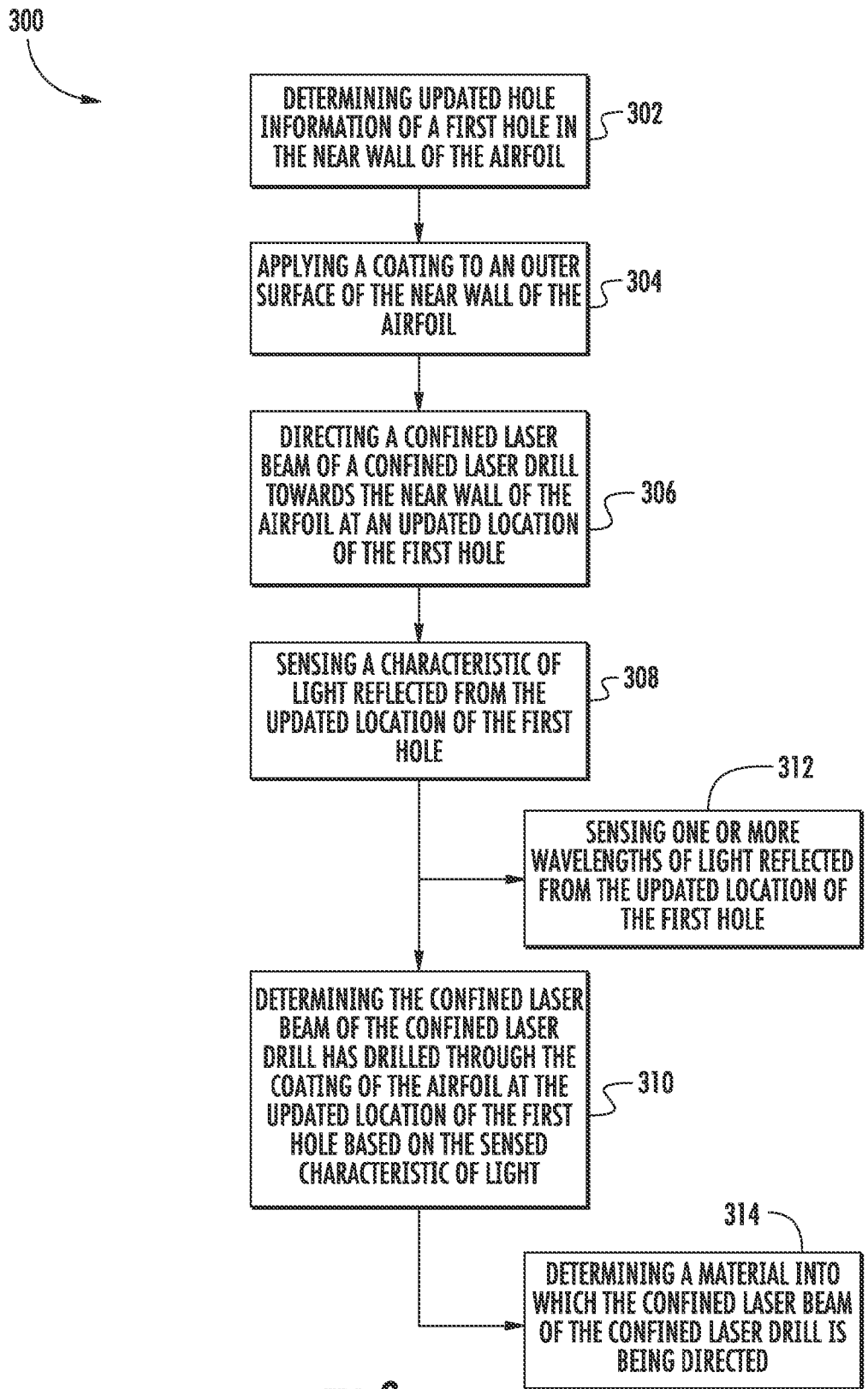
FIG. 9 is a flow diagram of a method for repairing an airfoil according to another exemplary aspect of the present disclosure.

Referring now to FIG. 9, a flow diagram is provided of an exemplary method (300) of repairing one or more holes in a near wall of an airfoil, such as the airfoil depicted in FIG. 2 and described above. The exemplary method of FIG. 9 may be used in conjunction with the system 60 depicted in FIGS. 7 and 8 and described above. Accordingly, although the exemplary method (300) is describe in the context of repairing an airfoil, the exemplary method (300) may additionally, or alternatively, be used in conduction with repairing any other suitable component of the gas turbine.

The exemplary method (300) of FIG. 9 includes at (302) determining updated hole information of the first hole using the confined laser drill. The updated hole information of the first hole determined at (302) may include an updated location of the first hole and an updated vector of the first hole. In certain exemplary aspects, determining the updated hole information of the first hole at (302) may be accomplished using the exemplary method (200) depicted in FIG. 6 and described above. For example, in certain aspects, determining the updated hole information of the first hole at (302) may include receiving original information of the first hole in the near wall of the airfoil, the original information including an original location of the first hole and an original vector of the first hole; determining the first hole is complete and unclogged; and confirming the original hole information of the first hole. Alternatively, however, in other exemplary aspects, any other suitable means or method may be used for determining the updated hole information of the first hole at (302).

Subsequent to determining the updated hole information of the first hole at (302), the exemplary method (300) may further include at (304) applying a coating to an outer surface of the near wall of the airfoil. Applying the coating at (304) to the outer surface of the near wall of the airfoil may be done without applying any covering or other similar protection to the first hole. Accordingly, applying the coating at (304) may include applying the coating to at least partially extend over and/or be positioned in the first hole.

Referring still to the exemplary method (300) of FIG. 9, the exemplary method (300) additionally includes at (306) directing a confined laser beam of the confined laser drill towards the near wall of the airfoil at the updated location of the first hole to drill through the coating extending over and/or positioned in the first hole of the near wall. In certain exemplary aspects, the confined laser beam may define a beam axis and directing the confined laser beam of the confined laser drill towards a near wall of the airfoil at (306) may include directing the confined laser beam towards a near wall of the airfoil such that the beam axis of the confined laser beam is not parallel to the updated vector of the first hole. For example, in certain exemplary aspects, directing the confined laser beam of the confined laser drill towards the near wall of the airfoil at (306) may include directing the confined laser beam towards the near wall of the airfoil such that the beam axis of the confined laser beam is substantially perpendicular to the outer surface of the near wall of the airfoil. Such a configuration may allow for more expedient removal of the coating extending over and/or positioned in the first hole in the near wall of the airfoil.

It should be understood, however, that in other exemplary aspects, the beam axis may define any suitable angle relative to the updated vector of the first hole. For example, in other exemplary aspects, confined laser beam may be directed towards the near wall of the airfoil such that the beam axis extends substantially along the updated vector of the first hole.

Referring still to FIG. 9, the exemplary method (300) additionally includes at (308) sensing a characteristic of light reflected from the updated location of the first hole. Moreover, the exemplary method includes at (310) determining the confined laser beam of the confined laser drill has drilled through the coating of the airfoil extending over and/or positioned in the first hole in the near wall of the airfoil based on the characteristic of light sensed at (308). For the exemplary aspect depicted, sensing at (308) a characteristic of light reflected from the updated location the first hole includes sensing one or more characteristics of light indicative of a material into which the confined laser beam is being directed. More particularly, in the exemplary aspect depicted, sensing at (308) a characteristic of light reflected from the updated location the first hole includes at (312) sensing one or more wavelengths of light reflected from the updated location of the first hole. However, in other exemplary aspects, sensing at (308) a characteristic of light reflected from the updated location of the first hole may additionally, or alternatively, include sensing any other characteristics of light indicative of the material into which the confined laser beam is being directed.

Additionally, for the exemplary aspect depicted, determining at (310) the confined laser beam of the confined laser drill has drilled through the coating of the airfoil includes at (314) determining the material into which the confined laser beam of the confined laser drill is being directed. By way of example, as discussed above, the one or more wavelengths of light reflected from an area into which the confined laser beam is being directed may be indicative of the material into which the confined laser beam is being directed. More particularly, once it is determined that the confined laser beam is being directed into a metal portion of the near wall of the airfoil, it may be determined that confined laser beam has drilled through the coating extending over and/or positioned in the first hole in the near wall of the airfoil.

Accordingly, the exemplary method (300) depicted may allow for re-coating of the near wall of the airfoil during repair operations without taking measures to cover or otherwise prevent such coating from extending over and/or being positioned in the one or more cooling holes in the near wall of the airfoil. Such a process may allow for a much more cost-efficient and time-efficient method for repairing an airfoil or other component for a gas turbine.

Figure 10:
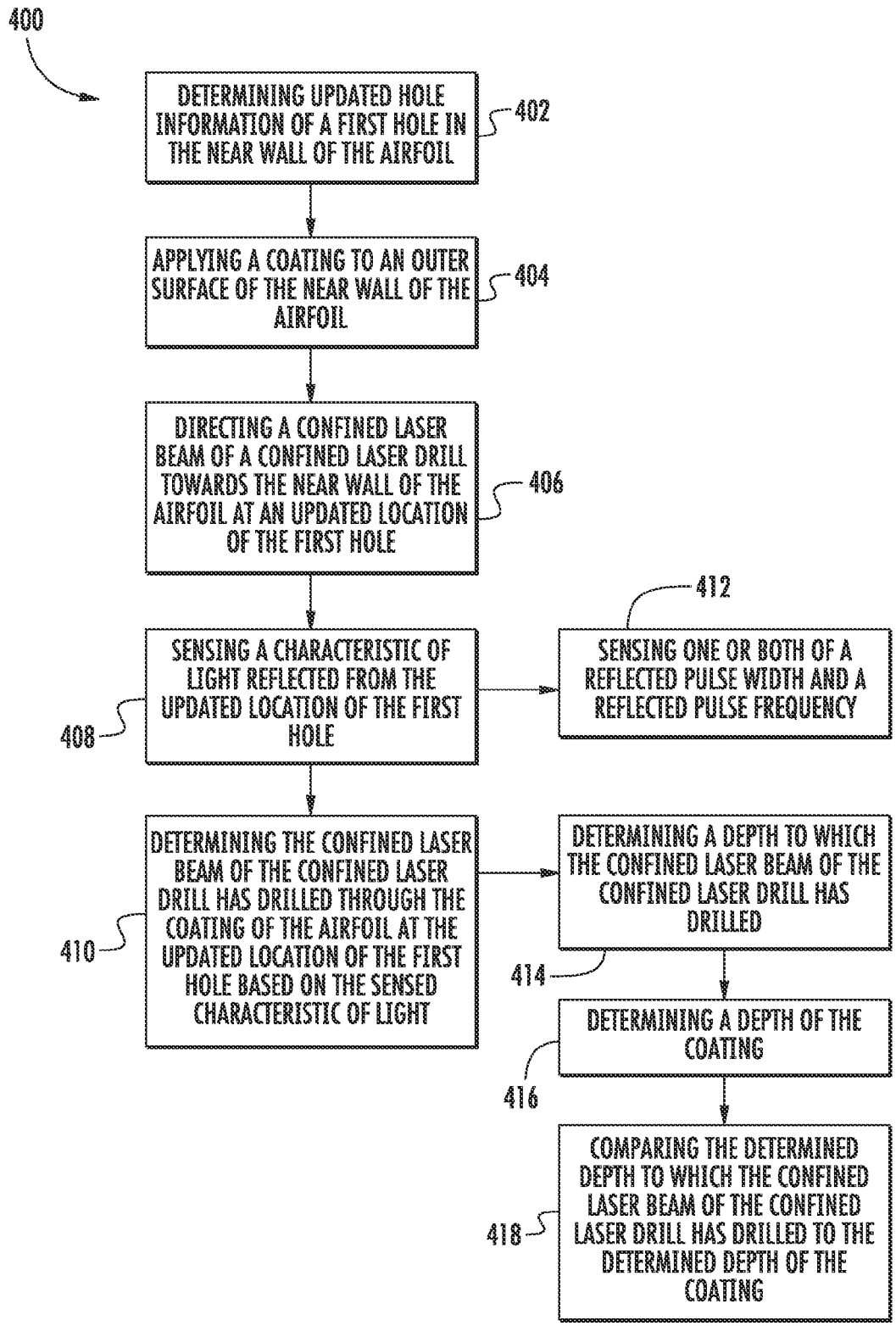
FIG. 10 is a flow diagram of a method for repairing an airfoil according to yet another exemplary aspect of the present disclosure.

Referring now to FIG. 10, a flow diagram is provided of another exemplary method (400) for repairing one or more holes in a near wall of an airfoil, such as the airfoil 38 depicted in FIG. 2 and described above. The exemplary method (400) of FIG. 10 may be used in conjunction with the system 60 depicted in FIGS. 7 and 8 and described above. Additionally, the exemplary method (400) of FIG. 10 is similar to the exemplary method (300) of FIG. 9, and thus similar numbering may refer to the same or similar steps.

For example, the exemplary method (400) of FIG. 10 includes at (402) determining updated hole information of the first hole using the confined laser drill and at (404) applying a coating to an outer surface of the near wall of the airfoil, such that the coating at least partially extends over and/or is positioned in the first hole. Additionally, the exemplary method (400) of FIG. 10 includes at (406) directing a confined laser beam of the confined laser drill towards the near wall of the airfoil at the updated location of the first hole to drill through the portion of the coating extending over and/or positioned in the first hole. Moreover, the exemplary method (400) of FIG. 10 includes at (408) sensing a characteristic of light reflected from the updated location of the first hole and at (410) determining confined laser beam of the confined laser drill has drilled through the coating of the airfoil at the updated location of the first hole based on the characteristic of light sensed at (408).

However, for the exemplary method (400) of FIG. 10, sensing a characteristic of light at (408) includes sensing one or more characteristics of light indicative of a depth to which the confined laser beam has drilled. More particularly, for the exemplary aspect depicted, sensing a characteristic of light at (408) includes sensing at (412) one or both of a reflected pulse width and a reflected pulse frequency of the light reflected from the updated location of the first hole. It should be appreciated, however, that in other exemplary aspects, sensing a characteristic of light at (408) may additionally, or alternatively, include sensing any other characteristics of light indicative of a depth to which the confined laser beam has drilled.

Additionally, for the exemplary aspect depicted in FIG. 10, determining the confined laser beam of the confined laser drill has drilled through the coating of the airfoil at (410) includes at (414) determining a depth to which the confined laser beam of the confined laser drill has drilled. More specifically, for the exemplary aspect depicted, the method (400) further includes at (416) determining a depth of the coating and at (418) comparing the depth to which the confined laser beam of the confined laser drill has drilled, determined at (414), to the depth of the coating determined at (416). For example, the exemplary method (400) may determine a depth of the coating at (416) by applying the coating to a tab or coupon, the tab being separate from the airfoil, when the coating is applied to the outer surface of the airfoil at (404), and measuring a depth of the coating on the tab. The depth of the coating on the tab may be indicative of the depth of the coating on the outer surface of the airfoil and thus may be indicative of the depth to which the confined laser beam of the confined laser drill must drill to clear the coating extending over and/or positioned in the first hole.

Once the determined depth to which the confined laser beam of the confined laser drill has drilled is equal to or within a predetermined threshold of the determined depth of the coating, the method (400) may determine the confined laser beam of the confined laser drill has drilled through the portion of the coating of the airfoil at the updated location of the first hole extending over and/or positioned in the first hole.

Notably, in certain exemplary aspects, the exemplary method (400) may additionally include modifying a geometry of the first hole in accordance with certain parameters inputted in the repair process. For example, during the repair process, it may be determined that, e.g., for better aerodynamic properties, an opening of the first hole on the near wall of the airfoil should be wider, should be deeper, and/or should define a different shape. Accordingly, the confined laser drill may drill deeper than the coating extending over and/or positioned in the first hole to provide a desired updated geometry of the first hole.

Moreover, although not depicted, the exemplary method (300) of FIG. 9 and/or the exemplary method (400) of FIG. 10 may further include moving the confined laser drill to updated locations of additional holes and repeating the processes discussed herein to drill through a portion of the coating extending over and/or positioned in each of the respective additional holes.

This written description uses examples to disclose the invention, including the best mode, and also to enable any person skilled in the art to practice the invention, including making and using any devices or system 60 and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method for repairing one or more holes in a near wall of a component, the method comprising:
   receiving original hole information of a first hole in the near wall of the component, the original hole information of the first hole including an original location of the first hole and an original vector of the first hole, the original location of the first hole being a location of the first hole in the near wall of the component as the component was designed and the original vector of the first hole being a vector of the first hole in the near wall of the component as the component was designed;
   directing a confined laser beam of a confined laser drill, the confined laser beam defining a beam axis, towards the near wall of the component at the original location of the first hole and along the original vector of the first hole such that the beam axis of the confined laser beam is aligned with the original vector of the first hole;
   sensing a characteristic of light reflected from the original location of the first hole; and
   determining a repair status of the first hole using the sensed characteristic of light reflected from the original location of the first hole, wherein determining the repair status of the first hole includes determining the confined laser beam is being directed into debris positioned within the first hole in the near wall of the component; and
   modifying an operational parameter of the confined laser drill to drill through the debris positioned within the first hole in the near wall of the component, wherein modifying the operational parameter of the confined laser drill includes controlling a power of the confined laser drill to drill through the debris positioned within the first hole in the near wall of the component;
   wherein determining the repair status of the first hole further includes determining the confined laser beam is passing completely through the near wall of the component, determining the first hole is complete and unclogged in response to determining the confined laser beam is passing completely through the near wall of the component, and determining updated hole information of the first hole, the updated hole information of the first hole being equal to the original hole information of the first hole.

2. The method of claim 1, wherein receiving the original hole information of the first hole in the near wall of the component includes receiving the original hole information of the first hole in the near wall of an airfoil of a gas turbine, and wherein directing the confined laser beam of the confined laser drill towards the near wall of the component includes directing the confined laser beam of the confined laser drill towards the near wall of the airfoil of the gas turbine.

3. The method of claim 1, wherein determining the repair status of the first hole includes determining a material into which the confined laser beam is being directed based on the sensed characteristic of light reflected from the original location of the first hole.

4. The method of claim 1, wherein determining the repair status of the first hole further includes
   determining the confined laser beam is being directed at least partially into the near wall of the component; and
   determining the near wall of the component has been at least partially deformed.

5. The method of claim 1, further comprising
   receiving original hole information of a second hole in the near wall of the component, the original hole information of the second hole including an original location of the second hole and an original vector of the second hole;
   directing the confined laser beam of the confined laser drill towards the near wall of the component at the original location of the second hole and along the original vector of the second hole such that the beam axis of the confined laser beam is aligned with the original vector of the second hole;
   sensing a characteristic of light reflected from the original location of the second hole; and
   determining a repair status of the second hole based on the sensed characteristic of light reflected from the original location of the second hole.

6. A system for repairing one or more holes in a near wall of a component, the system comprising:
   a confined laser drill utilizing a confined laser beam defining a beam axis;
   a sensor positioned to sense a characteristic of light reflected from a first hole in the near wall of the component; and
   a controller operably connected to the confined laser drill and the sensor, the controller configured to
   receive original hole information of the first hole in the near wall of the component, the original hole information of the first hole including an original location of the first hole and an original vector of the first hole, the original location of the first hole being a location of the first hole in the near wall of the component as the component was designed and the original vector of the first hole being a vector of the first hole in the near wall of the component as the component was designed;

direct the confined laser beam towards the near wall of the component at the original location of the first hole and along the original vector of the first hole; and determine a repair status of the first hole based on the characteristic of light reflected from the first hole and sensed by the sensor, wherein determining the repair status of the first hole includes determining the confined laser beam is being directed into debris positioned within the first hole in the near wall of the component; and modify an operational parameter of the confined laser drill to drill through the debris positioned within the first hole in the near wall of the component, wherein modifying the operational parameter of the confined laser drill includes controlling a power of the confined laser drill to drill through the debris positioned within the first hole in the near wall of the component;

wherein determining the repair status of the first hole further includes determining the confined laser beam is passing completely through the near wall of the component, determining the first hole is complete and unclogged in response to determining the confined laser beam is passing completely through the near wall of the component, and determining updated hole information of the first hole, the updated hole information of the first hole being equal to the original hole information of the first hole.

7. The system of claim 6, wherein the sensor is an optical sensor configured to sense one or more wavelengths of the light reflected from the first hole in the near wall of the component.

8. A method for repairing one or more holes in a near wall of a component, the method comprising:

receiving original hole information of a first hole in the near wall of the component, the original hole information of the first hole including an original location of the first hole and an original vector of the first hole;

directing a confined laser beam of a confined laser drill, the confined laser beam defining a beam axis, towards the near wall of the component at the original location of the first hole and along the original vector of the first hole such that the beam axis of the confined laser beam is aligned with the original vector of the first hole;

sensing a characteristic of light reflected from the original location of the first hole;

determining a repair status of the first hole using the sensed characteristic of light reflected from the original location of the first hole, wherein determining the repair status of the first hole includes determining the confined laser beam is being directed into debris positioned within the first hole in the near wall of the component; and modifying an operational parameter of the confined laser drill to drill through the debris positioned within the first hole in the near wall of the component, wherein modifying the operational parameter of the confined laser drill includes controlling a power of the confined laser drill to drill through the debris positioned within the first hole in the near wall of the component;

wherein determining the repair status of the first hole further includes determining the confined laser beam of the confined laser drill is passing completely through the near wall of the component and determining the first hole is complete and unclogged, and determining updated hole information of the first hole, the updated hole information of the first hole being equal to the original hole information of the first hole.

\* \* \* \* \*